United States Patent [19]

Johnson

[11] Patent Number: 5,673,139
[45] Date of Patent: Sep. 30, 1997

[54] MICROELECTROMECHANICAL TELEVISION SCANNING DEVICE AND METHOD FOR MAKING THE SAME

[75] Inventor: Michael D. Johnson, Madison, Ala.

[73] Assignee: Medcom, Inc., Redmond, Wash.

[21] Appl. No.: 93,580

[22] Filed: Jul. 19, 1993

[51] Int. Cl.$^6$ .................................................. G02B 26/00
[52] U.S. Cl. ............................ 359/291; 257/415; 359/846
[58] Field of Search ............................ 257/415; 359/290, 359/291, 846

[56] References Cited

U.S. PATENT DOCUMENTS

| | | | |
|---|---|---|---|
| 3,471,641 | 10/1969 | Baker et al. | 359/220 |
| 4,073,567 | 2/1978 | Lakerveld et al. | 359/223 |
| 4,230,393 | 10/1980 | Burke, Jr. | 359/220 |
| 4,708,420 | 11/1987 | Liddiard | 359/199 |
| 5,097,354 | 3/1992 | Goto | 359/212 |
| 5,231,879 | 8/1993 | Yamamoto | 257/415 |
| 5,260,596 | 11/1993 | Dunn et al. | 257/415 |

OTHER PUBLICATIONS

IBM Technical Disclosure Bulletin, "Three–Terminal Latching . . . ", vol. 30, No. 6, Nov. 1987, pp. 393 & 394.
Petersen, "Silicon Torsional Scanning Mirror", IBM Journal of Research Development, vol. 24, No. 5, Sep. 1980.
Petersen, "Silicon as a Mechanical Material", IEEE Proceedings, Vo. 70, No. 5, May, 1982.
Breng et al., "Electrostatic micromechanic actuators", 1992.
Feynman, "There's Plenty of Room at the Bottom", IEEE Journal of Microelectromechanical Systems, vol. 1, No. 1, Mar. 1992.

*Primary Examiner*—Georgia Y. Epps
*Assistant Examiner*—Thomas Robbins
*Attorney, Agent, or Firm*—Robert M. Storwick

[57] ABSTRACT

An electrically actuated microelectromechanical television scanning device for television image scanning or related functions. The scanning device can be produced in forms having characteristic dimensions in the submillimeter range. The scanning device consists of an electrostatically actuated plate with two degrees of freedom. A photoemitter, photoreceptor or other suitable device may be located on the plate, facilitating operation of the device as a flying spot scanner, television image dissector or television display. The scanning device can be fabricated similarly to monolithic integrated circuits.

18 Claims, 14 Drawing Sheets

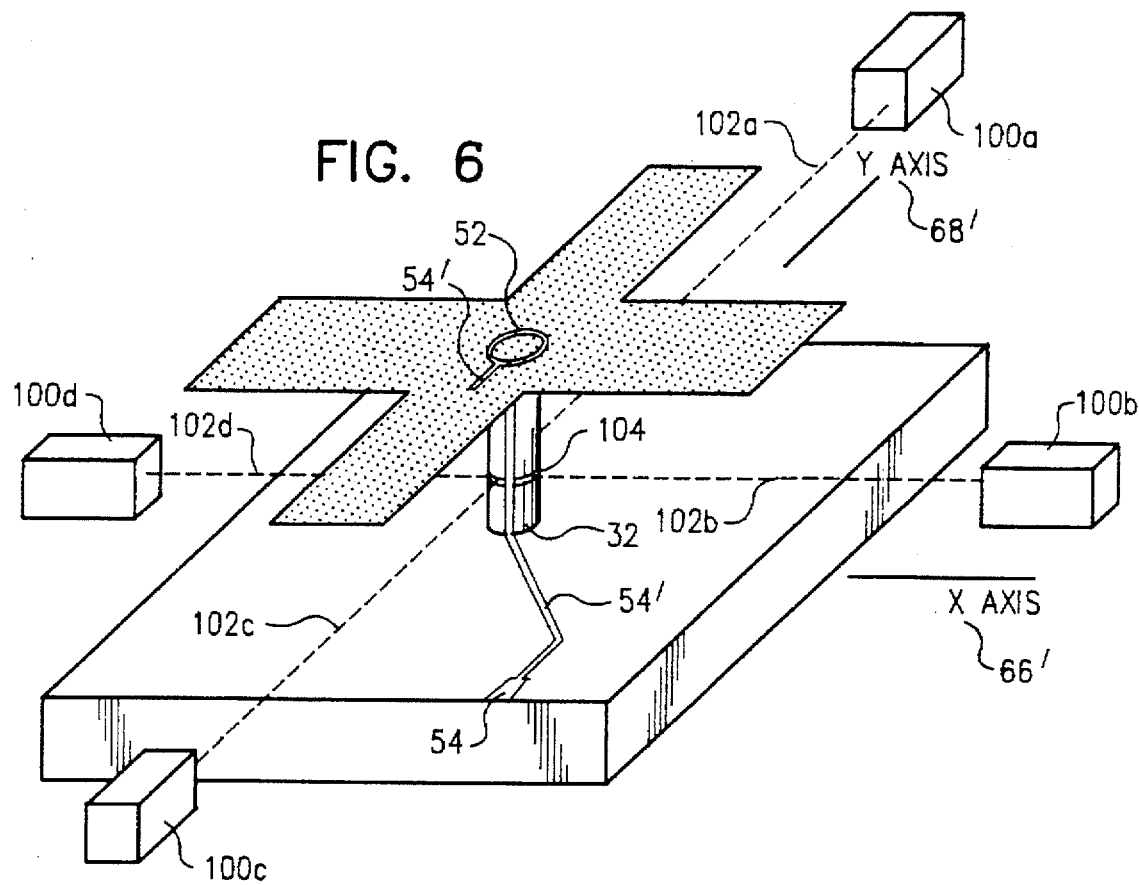

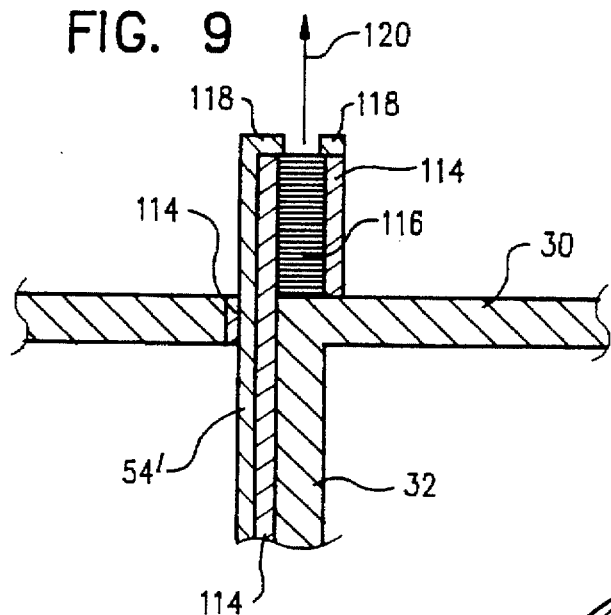
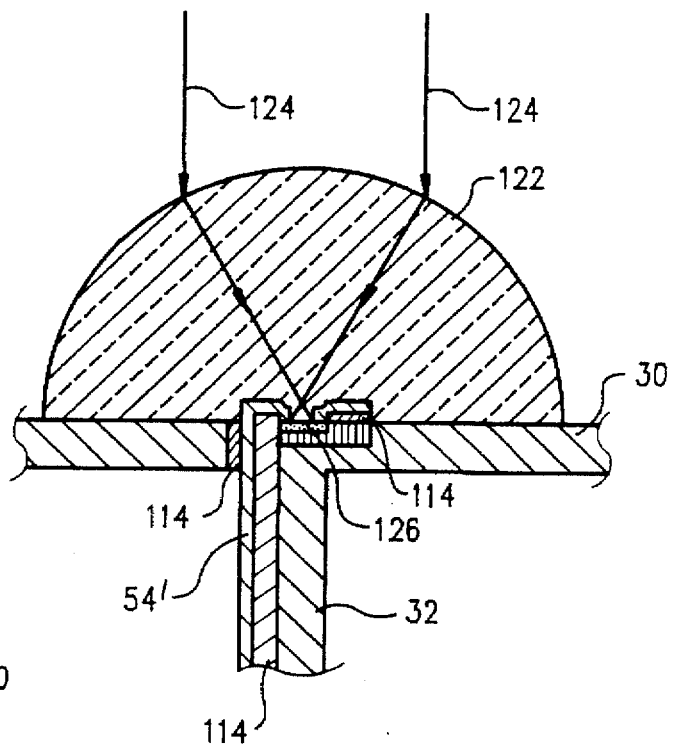
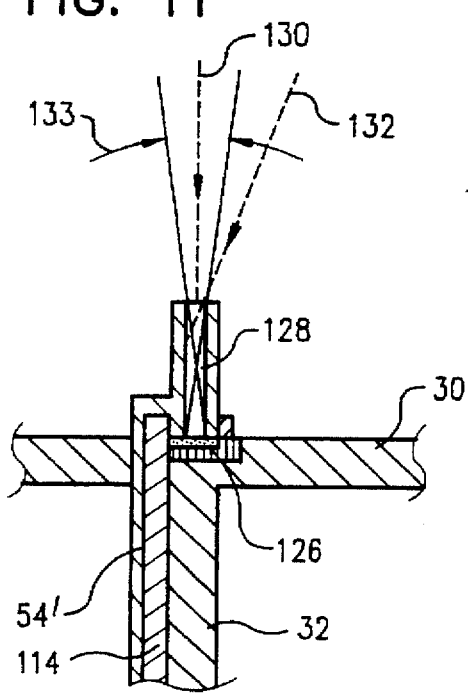

MASK 1

MASK 2

MASK 3

MASK 4

MASK 5

MASK 6

MICROELECTROMECHANICAL TELEVISION SCANNING DEVICE AND METHOD FOR MAKING THE SAME

FIELD OF THE INVENTION

This invention relates generally to mechanical television scanning mechanisms and more particularly to microelectromechanical television scanning mechanisms fabricated according to the principles used to fabricate monolithic integrated circuits, thus enabling the physical dimensions of the scanning mechanism to be submillimeter in scale.

DESCRIPTION OF THE PRIOR ART

Typically, prior art mechanical television scanning mechanisms are large, require external light sources or sensors, have limited operating frequencies and geometrical fields of view, and are fragile. Additionally, prior art mechanical scanners generally include many components. Such mechanisms generally require extensive and intricate manufacturing processes, with associated high costs and low reliability.

Therefore, there is a need for a scanning mechanism that is small in size, facilitates integral light sources or sensors, has a wide geometrical field of view, high operating frequency and is robust in construction. Of the known mechanical television scanning mechanisms, only the scanner provided by the present invention is fabricated in much the same manner as monolithic integrated circuits, thus enabling the physical dimensions of the device to be exceedingly small.

GOTO, in U.S. Pat. No. 5,097,354, discloses a beam scanner which is an electrostatically actuated, torsionally supported two-dimensional scanning mirror. This scanner is constructed in two components. In addition to its simplicity, the scanner features a torsional mirror mount which limits the range of angular deflection of the mirror. This patent also discloses transducers including a vibrating photoelectric sensor in the focal plane of a Fresnel lens.

PETERSEN, in an article entitled "Silicon Torsional Scanning Mirror", IBM J. Res. Develop., Vol. 24, no. 5, September 1980, discloses a silicon torsional scanning mirror which is electrostatically actuated and torsionally supported on a single scanning axis. The device disclosed is constructed in two components, including a scanning mirror element. The scanning mirror element is fabricated from single crystal silicon, which limits the precision of fabrication due to crystal plane etching.

LIDDIARD, in U.S. Pat. No. 4,708,420, discloses a focal plane scanning device which uses piezoelectric actuators and a mirror rigidly fixed to a central compliant flexure member. This arrangement permits deflection about two axes.

BURKE, in U.S. Pat. No. 4,230,393, discloses a two-axis optical scanner which uses a compliant flexure member. The flexure member is compliant in two axes, with each axis having an associated resonance. The flexure member is excited into oscillation at one end by a mechanical oscillator, and has a scanning mirror located at its other end. The scanning mirror scans in the two axes at the associated resonance frequencies in response to excitation by the mechanical oscillator.

LAKERVELD et al., in U.S. Pat. No. 4,073,567, disclose a pivoting mirror device which is actuated electromagnetically, The device includes an oscillating mirror that is centrally supported by a single point bearing, and the bearing permits the mirror to oscillate about two axes.

Finally, BAKER et. al., in U.S. Pat. No. 3,471,641, disclose a resonant scanning apparatus for deflecting a mirror which uses electromagnetic or piezoelectric actuators. This device includes a mirror rigidly fixed to a central compliant flexure member that is actuated by the actuators to permit deflection about two axes.

SUMMARY OF THE INVENTION

The long-standing but heretofore unfulfilled need for a scanning device having the desirable features of small physical dimensions, integral light sources or sensors, a wide geometrical field of view, high operating frequency, robust construction, easy manufacture, low cost and high reliability, is fulfilled by the invention disclosed and described in the detailed description which follows.

According to one aspect, the invention is a scanning device. The scanning device comprises a substrate made from a first material and a flexible joint located above the substrate. The flexible joint is made from a second material. The scanning device further comprises a support attached to the flexible joint. The support is made from a third material. In addition, the scanning device includes an actuator formed on at least one of the substrate, the flexible joint and the support. The actuator is able to cause the support to move relative to the substrate. Further, the scanning device includes an optical element on the upper surface of the support.

In one embodiment, the scanning assembly is composed of a cross-shaped thin film plate of electrically conductive material (e.g., boron-doped polysilicon crystal). This plate is supported by a flexible member made from a material that is similar to the material from which the plate is made. The flexible member terminates at a fixed base which contains four electrostatic actuator electrodes. This flexible member extends perpendicularly from the center of the cross-shaped plate and is of suitable length to permit sufficient angular displacement of the cross-shaped plate.

The four electrostatic electrodes (e.g., of deposited aluminum film) are located on the fixed base, directly below the four arms of the cross-shaped plate, and act as electrostatic actuators of the cross-shaped plate. Each conductive electrode has slightly smaller dimensions than the corresponding arm of the cross-shaped plate. Electrically conductive lines or junction isolated conductors (e.g., of deposited aluminum film) from the conductive electrodes communicate with pads located on the fixed base. An insulating film (e.g., of silicon dioxide) is deposited between the conductive plates, the conductive lines and the fixed base. Attraction and repulsion forces are induced between the base and the cross-shaped plate when a voltage is applied between the conductive plates and the arms of the moving cross-shaped plate. These forces can cause the cross-shaped plate to move in directions about two distinct axes.

The previously mentioned flexible member contains any number of electrically conductive lines or junction isolated conductors (e.g., of deposited aluminum film) deposited on its outer surface. These lines communicate between any desired number of light sources or sensors located on the top side of the cross-shaped plate and the pads located on the fixed base.

A flexible member perpendicular to the fixed base is not the only way to support the moving cross-shaped plate. In another embodiment of the invention, suspension of the cross-shaped plate is accomplished by a thin film gimbal. In this embodiment a thin planar film of flexible material (e.g., polycrystalline silicon) is supported above the fixed base and perforated in such a manner as to form a gimbal ring supported externally by two thin, torsionally flexible collinear supports. In addition, the cross-shaped plate is formed centrally by the perforations. The cross-shaped plate is supported by two further thin, torsionally flexible, collinear supports that are positioned orthogonally to the aforementioned two collinear supports. In this manner the central plate is free to be rotated out of the plane of the thin film of flexible material in any desired direction. The cross-shaped plate has any desired number of light sources or sensors formed on its upper surface, with conductive lines communicating from the light sources or sensors to stationary electrodes located on the fixed base. The entire gimbal assembly is suspended above the fixed base, which contains the electrostatic actuator plates.

A further means of suspension of the moving cross-shaped plate is by thin film spiral springs. In a preferred embodiment of the invention involving this method, a thin film of flexible material (e.g., polycrystalline silicon) is supported above the fixed base and perforated in such a manner as to form a series of spirals communicating from the internal edge of a circular perforation to the outer edge of the cross-shaped plate. In this manner the central plate is free to be rotated out of the plane of the thin film of flexible material in any desired direction. The cross-shaped plate has any desired number of light sources or sensors formed on its upper surface, with conductive lines communicating from the light sources or sensors to stationary electrodes located on the fixed base. The entire spring assembly is suspended above the fixed base, which contains the electrostatic actuator plates.

Actuation of any of the aforementioned embodiments of the inventive device is not necessarily electrostatic. One possible additional way of actuating the embodiment is magnetically accomplish this, conductors of deposited aluminum film are shaped to form spiralling coils on the arms of the cross-shaped plate. When the inventive device is placed in a magnetic field of proper orientation, current passing through any one of the coils produces a moment which deflects the cross member in a known direction. A proper combination of the currents through selected coils can cause the cross-shaped plate to deflect in the desired fashion. While operating under the control of magnetic fields generated by coils, the inventive device operates similarly to a moving coil galvanometer, which is known in the prior art.

Still another additional way to actuate the cross-shaped plate involves piezoelectric actuators. For piezoelectric action, four small blocks of conventional piezoelectric crystal film (e.g., zinc oxide) are formed, one block directly under each of the arms of the cross-shaped plate. The piezoelectric crystal films are individually fixed between the base of the inventive device and the arms of the cross-shaped plate. Actuation occurs when current is applied, in the manner known in the prior art, across the piezoelectric crystal films. The piezoelectric crystal films expand or contract in a direction perpendicular to the plane formed by the arms of the cross-shaped plate in accordance with the polarity and magnitude of voltage applied. When the motion of the piezoelectric crystal films is properly coordinated, the desired scanning motion of the cross-shaped plate is achieved.

Yet another way to actuate the cross-shaped plate uses forces that are created by thermal stress. By locally heating the member that connects between the base and the cross-shaped plate (through resistive or optical means), a temperature gradient causes a bending moment in the connecting member. This bending moment causes the connecting member to bend away from the source of heat, much in the same manner as a bimetallic strip bends. By selectively heating different positions on the connecting member, any desired scanning motion of the cross-shaped plate can be generated.

The transducers located on the top of the cross-shaped plate and/or on the fixed base can serve a variety of functions regardless of how the cross-shaped plate is caused to scan. In the case where a laser diode is located on the moving cross-shaped plate and photoreceptors (e.g., phototransistor, photodiode, etc.) are located on the fixed base, the inventive device acts as a flying spot scanner. The laser light emitted from the laser diode is scanned by the moving cross-shaped plate across an object in a raster pattern. The light reflected from the object is detected by the stationary photoreceptor, which converts the variations of the detected reflected light into a video signal. Additionally, photoreceptors can be collocated on the moving cross-shaped plate with the laser diode permitting a more compact design.

When the diode laser located on the top of the moving cross-shaped plate is modulated and scanned in accordance with an incoming video signal, it is possible to use the inventive device as a television monitor. The television monitor constructs an image by projecting the modulated laser light beam from the scanner onto a translucent or opaque screen.

If a photoreceptor replaces the laser diode on the moving cross member, the inventive device can be used as an image dissector. Ambient light or light from a self-contained source (such as a laser diode) can be reflected from the object being imaged and is then detected by the photoreceptor which is scanned across the directions of the image by the moving cross-shaped plate. Some form of light collimator (e.g., a lens or tube made of deposited aluminum) can also be located on the moving cross-shaped plate above the photoreceptor, thus providing further directional sensitivity to the photoreceptor. High directional sensitivity of the photoreceptor can be required in this mode of operation in order to dissect the image by one beamwidth of the laser light beam per scanner pass.

A further embodiment of the inventive device includes a combination of both a laser diode and collimated photoreceptor on the cross-shaped plate. This combination of elements permits operation of the inventive device in any of the previously mentioned ways by activation of the laser diode, photoreceptor or any combination thereof.

Also, if a reflective surface is formed or placed on the top surface of the cross-shaped plate, a still further embodiment of the inventive device can be used as a reflective scanning device, with light from a stationary light source (such as a laser diode) reflecting off the surface of the cross-shaped plate as it moves.

Other objects of this invention will become apparent in the detailed description of the preferred embodiment of the invention. The invention comprises the features of construction, combinations of elements and arrangements of parts that will be exemplified in the construction hereinafter set forth, and the scope of the invention will be determined by the claims.

BRIEF DESCRIPTION OF THE DRAWINGS

FIG. 6 is an orthogonal view of a sixth preferred embodiment of the scanning device of the invention, the sixth embodiment having a thermally actuated configuration.

FIG. 9 is a detailed view of a scanning laser configuration in accordance with the present invention.

FIG. 10 is a detailed view of an optically collimated photoreceptor configuration in accordance with the present invention.

FIG. 11 is a detailed view of a tube-collimated photoreceptor configuration in accordance with the present invention.

DETAILED DESCRIPTION OF THE PREFERRED EMBODIMENT

Figure 1:
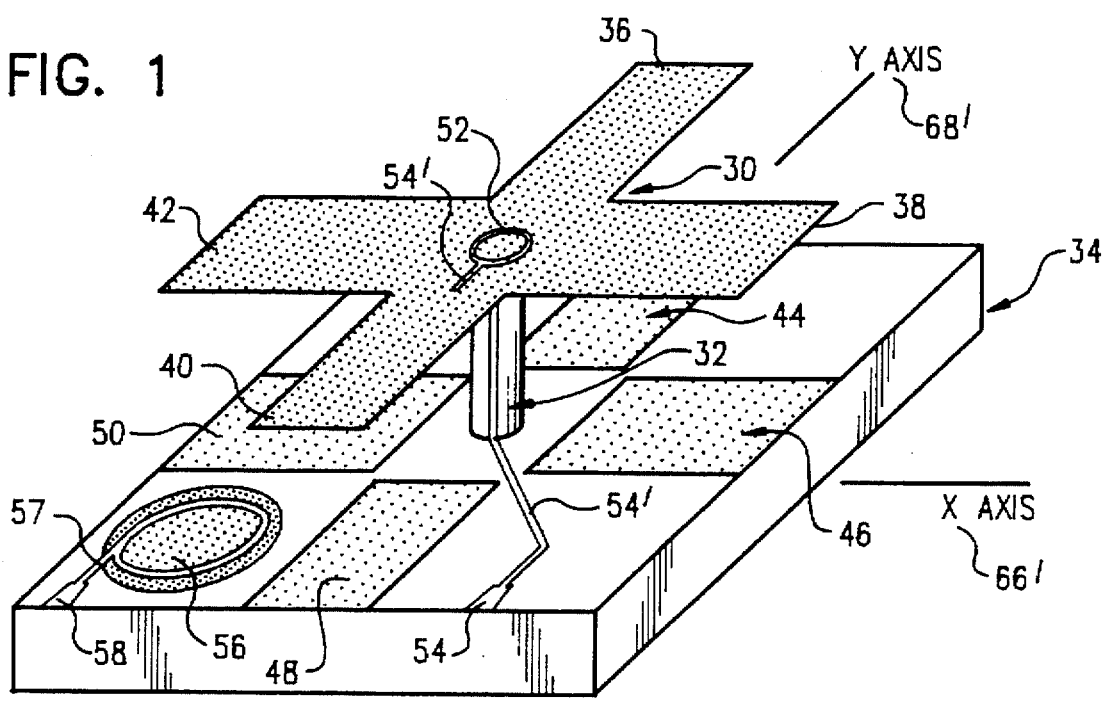
FIG. 1 is an orthogonal view of a first preferred embodiment of the microelectromechanical television scanning device according to the invention, the first preferred embodiment having a suspended cross-shaped plate.

FIG. 1 is an orthogonal view of a first preferred embodiment of the microelectromechanical television scanning device according to the invention, the first preferred embodiment having a suspended cross-shaped plate. The scanning cross-shaped plate 30 (e.g., made from a material such as deposited n-doped polysilicon) is affixed to a flexible shaft 32 made from the same material as the scanning cross-shaped plate 30. The flexible shaft 32 is anchored to a fixed base 34 made of the same material as the flexible shaft 32. The scanning cross-shaped plate 30 has arms denoted by reference numerals 36, 38, 40 and 42. The fixed base 34 has electrodes 44, 46, 48 and 50 (e.g., made of deposited aluminum film) formed thereon. The electrodes 44, 46, 48 and 50 respectively attract or repel the moving cross arms 36, 38, 40 and 42, depending upon the voltage applied to them. A photoelectric device 52 (e.g., a laser diode or collimated photoreceptor) is located on the top of the scanning cross-shaped plate 30. Electrical communication with the photoelectric device 52 is accomplished through a conductive line 54' (e.g., made of deposited aluminum film) and an electrode 54 made from the same material as the conductive line 54'. Another photoreceptor or photoemitter 56 may be located on the fixed base 34, with electrical communication established by a conducting line 57 (or junction isolated conductor, e.g., made of deposited aluminum film) and an electrode 58 made from the same material.

Figure 2:
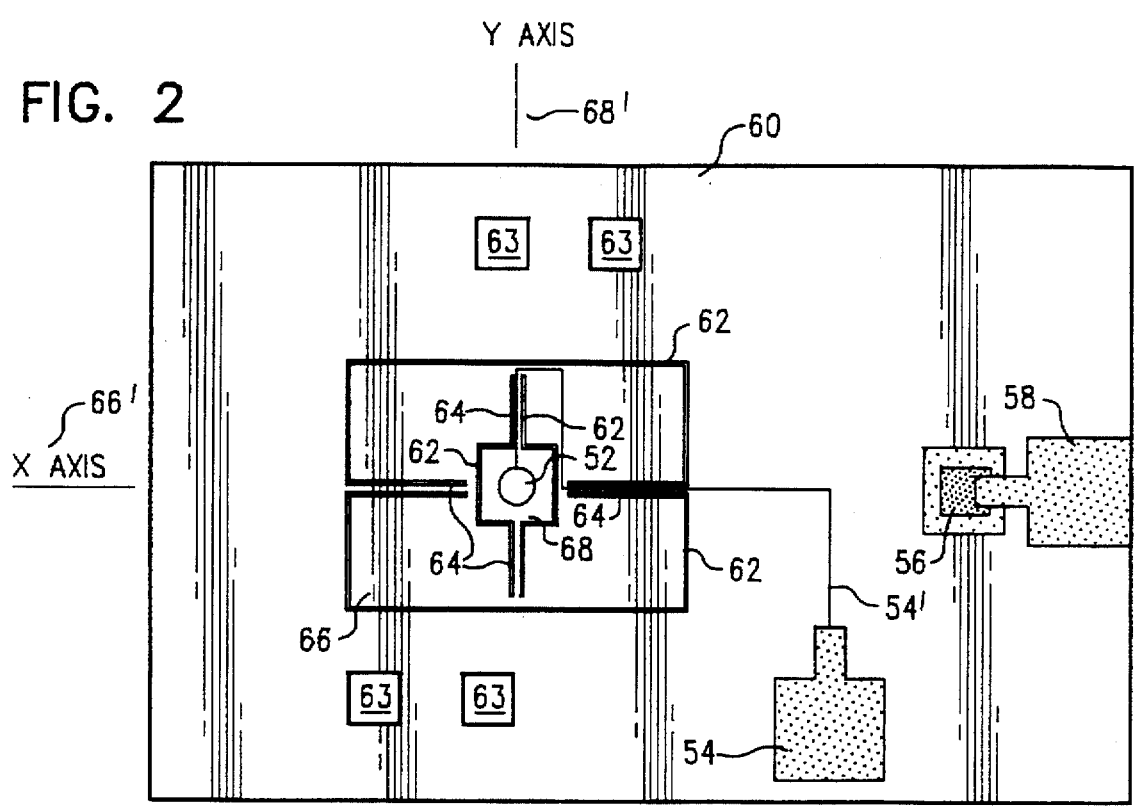
FIG. 2 is a top view of a second preferred embodiment of the scanning device of the invention, the second embodiment having a gimbaled moving plate suspension.

FIG. 2 is a top view of a second preferred embodiment of the scanning device of the invention, the second embodiment having a gimbaled moving plate suspension. A thin film 60 of a flexible material (e.g., deposited n-doped polysilicon) is located above the fixed base 34, with the electrodes 44, 46, 48 and 50 being formed on the fixed base 34. The thin film 60 is perforated by perforations 62 in a manner that forms small torsionally flexible regions 64. Additionally, a gimbal ring 66 and a central gimbal plate 68 is formed by the perforations 62. The gimbal ring 66 is free to rotate about the y-axis 66' and the central gimbal plate 68 is free to rotate about the x-axis 68'. Electrical communication between the outside electrode 54 and the photoelectric device 52 is established by the conducting line 54'.

Figure 3:
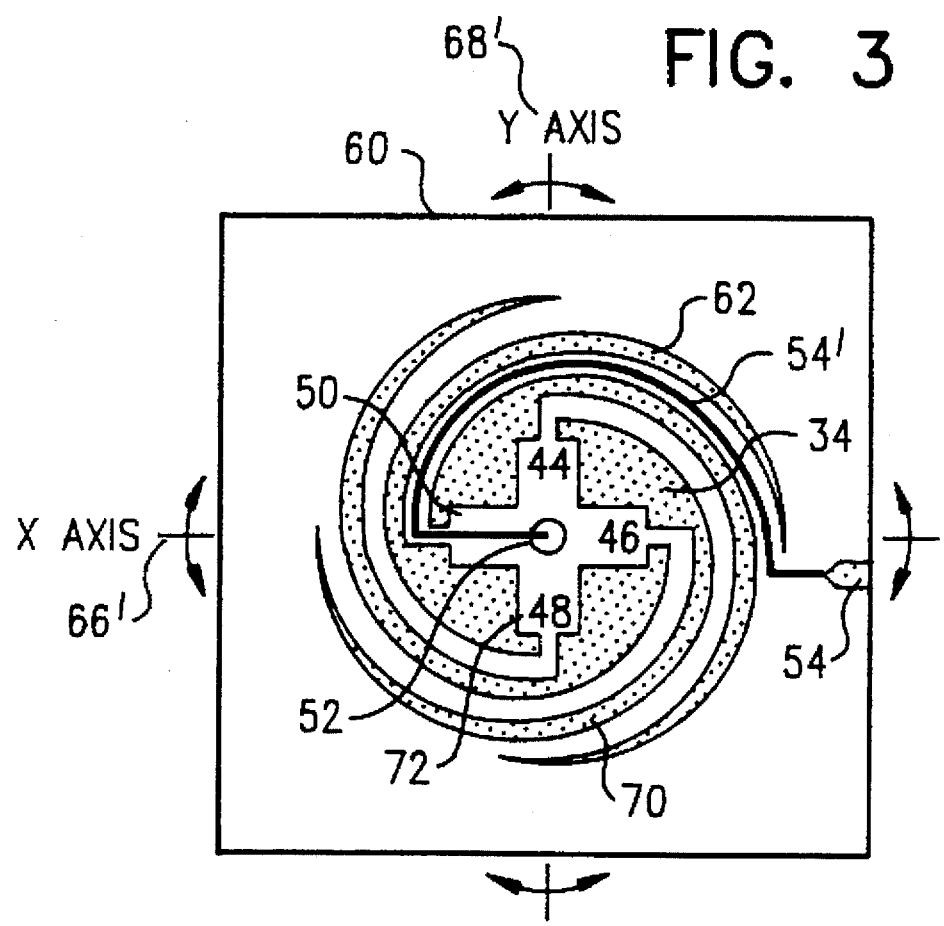
FIG. 3 is a top view of a third preferred embodiment of the scanning device of the invention, the third embodiment having an alternate spiral spring moving plate suspension.

FIG. 3 is a top view of a third preferred embodiment of the scanning device of the invention, the third embodiment having an alternate spiral spring moving plate suspension. The thin film 60 of the flexible material is located above the fixed base 34, with the electrodes 44, 46, 48 and 50 being formed on the fixed base 34. The thin film 60 is perforated by the perforations 62 in a manner that forms long, thin linear springs 70. Additionally, a modified scanning cross-shaped plate 72 is formed. The scanning cross-shaped plate 72 is free to rotate about the x- or y-axis (68' and 64', respectively). Electrical communication between the electrode 54 and the photoelectric device 52 is established by the conducting line 54'.

Figure 4:
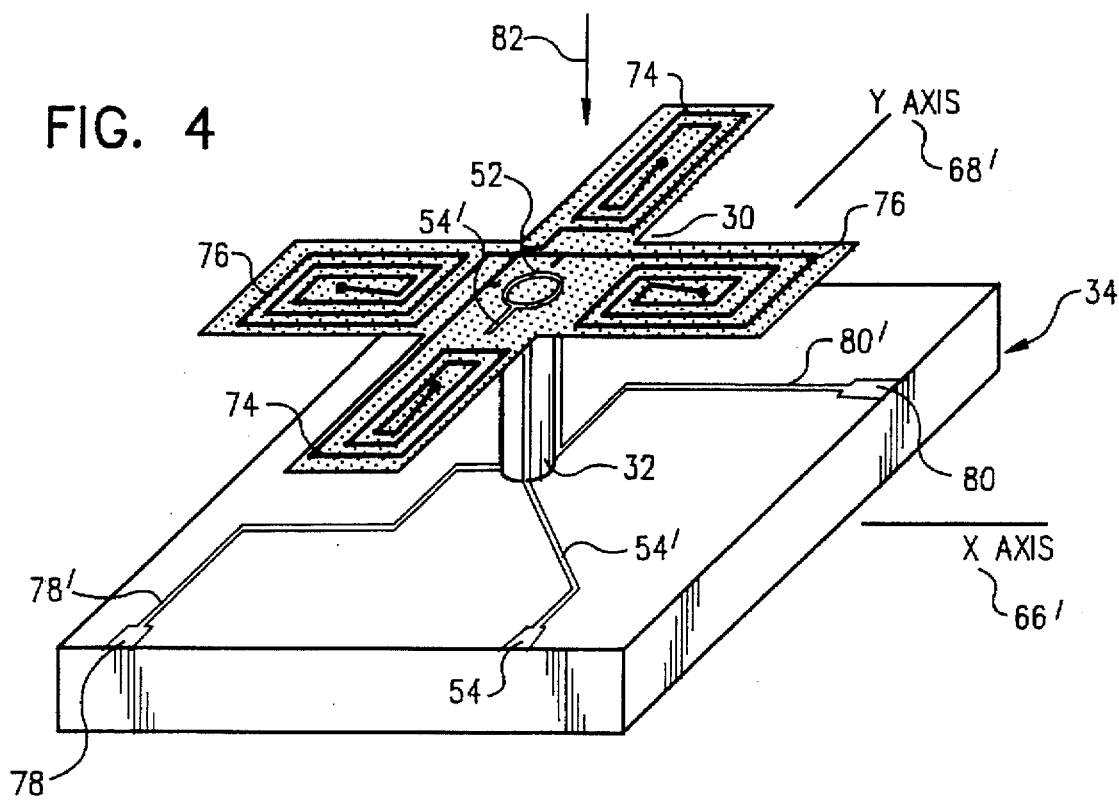
FIG. 4 is an orthogonal view of a fourth preferred embodiment of the scanning device of the invention, the fourth embodiment having a magnetically actuated configuration.

FIG. 4 is an orthogonal view of a fourth preferred embodiment of the scanning device of the invention, the fourth embodiment having a magnetically actuated configuration. The scanning cross-shaped plate 30 includes a set of electrically conductive coils 74 and 76 (e.g., made of deposited aluminum film) formed on its upper surface. Electrodes 78 and 80 electrically communicate with the coils 74 and 76, respectively, through electrically conductive traces. When the scanning cross-shaped plate 30 is positioned in a magnetic field 82 and electric current is modulated in the proper fashion in the coils 74 and 76, the scanning cross-shaped plate 30 will scan in any desired motion.

Figure 5:
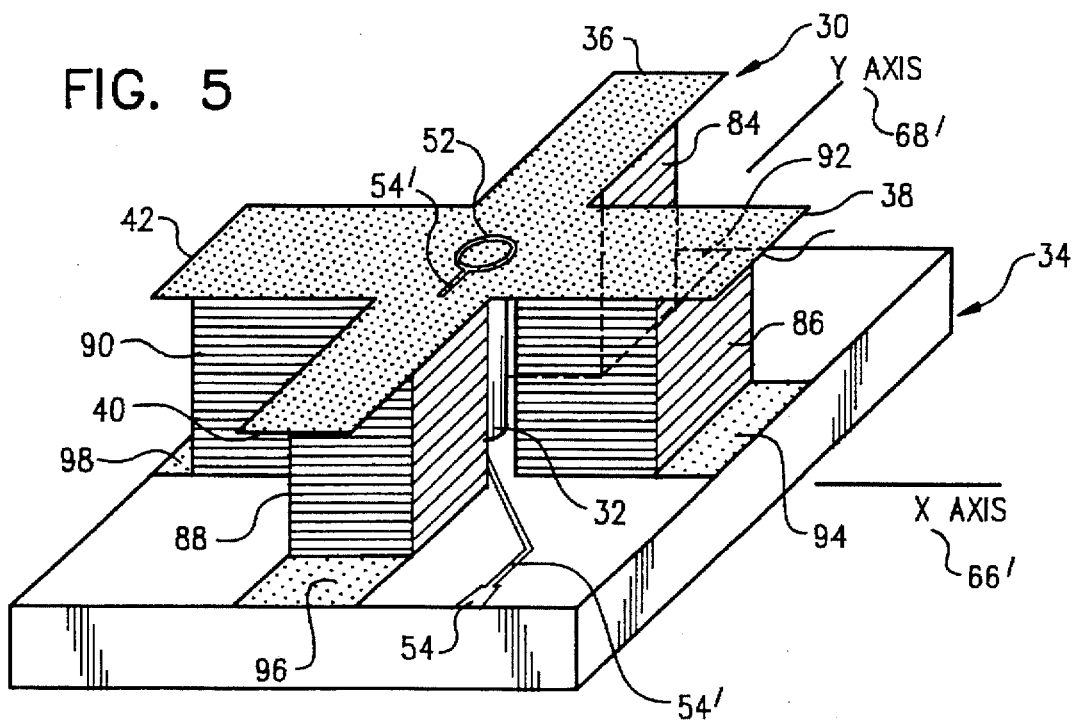
FIG. 5 is an orthogonal view of a fifth preferred embodiment of the scanning device of the invention, the fifth embodiment having a piezoelectrically actuated configuration.

FIG. 5 is an orthogonal view of a fifth preferred embodiment of the scanning device of the invention, the fifth embodiment having a piezoelectrically actuated configuration. The piezoelectric crystals 84, 86, 88 and 90 (e.g., made of deposited zinc oxide film) are formed on the fixed base 34, and support the scanning cross-shaped plate 30. Electrical communication is established between the electrodes 92, 94, 96 and 98 (e.g., made of deposited aluminum film), through the piezoelectric crystals 84, 86, 88 and 90, respectively, to the moving cross arms 36, 38, 40 and 42, respectively, and down through the flexible shaft 32. The electrodes 92, 94, 96 and 98 are electrically isolated from the fixed base 34.

FIG. 6 is an orthogonal view of a sixth preferred embodiment of the scanning device of the invention, the sixth embodiment having a thermally actuated configuration. The thermal lasers 100 emit a light beam 102 containing light at a suitable wavelength, to heat the flexible shaft 32 at an area 104. After the area 104 of the flexible shaft 32 is heated by the light beam 102, the flexible shaft 32 bends in the direction of the source of the heat, in this case, in the direction of the area 104. By appropriately varying the heating and cooling of the area 104 by means of the lasers 100, the scanning cross-shaped plate 30 will scan in the desired direction.

Figure 7A:
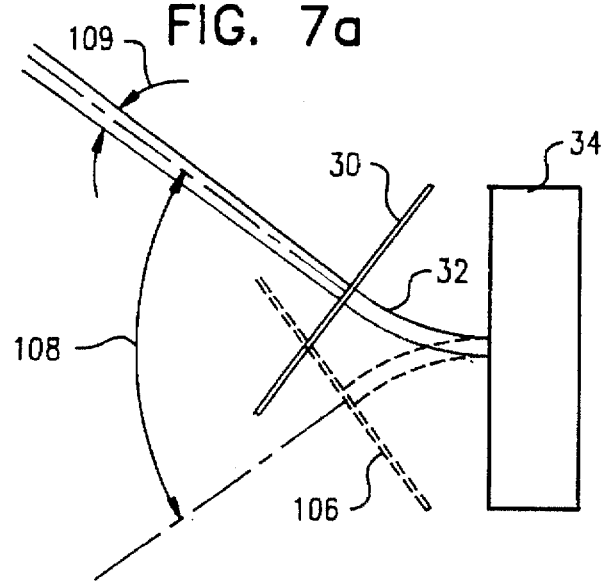
FIG. 7a illustrates a high amplitude action of the moving plate about a single axis.

FIG. 7a illustrates a high amplitude action of the moving plate about a single axis. The phantom view of the moving cross-shaped plate 106 illustrates one extreme of excursion while the solid view of the scanning cross-shaped plate 30 illustrates the other extreme of excursion. The angle of view 108 experienced by the scanning cross-shaped plate 30 in this situation is wide.

Figure 7B:
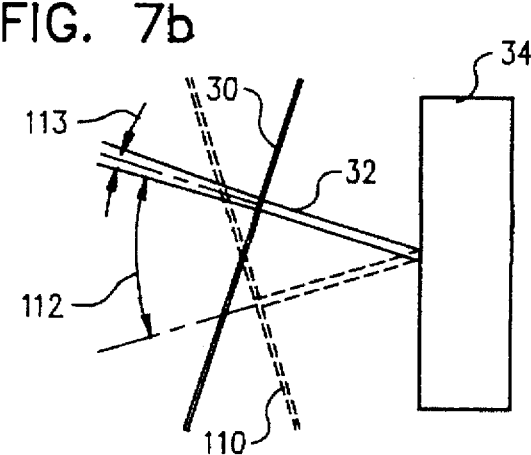
FIG. 7b illustrates a low amplitude action of the moving plate about a single axis.

FIG. 7b illustrates a low amplitude action of the moving plate about a single axis. The phantom view of the scanning cross-shaped plate 110 illustrates one extreme of excursion while the solid view of the scanning cross-shaped plate 30 illustrates the other extreme of excursion. The angle of view 112 experienced by the scanning cross-shaped plate 30 in this situation is narrow.

From FIGS. 7a and 7b, it is readily apparent that increasing the amplitudes of the signals input to the actuating components the angle of view of the scanner increases. Thus, the angle of view of the scanner is easily and readily changed at will by changing the signals. This produces the effect of a varying focal length lens (i.e., zoom lens) without the associated complicated optics.

Figure 8:
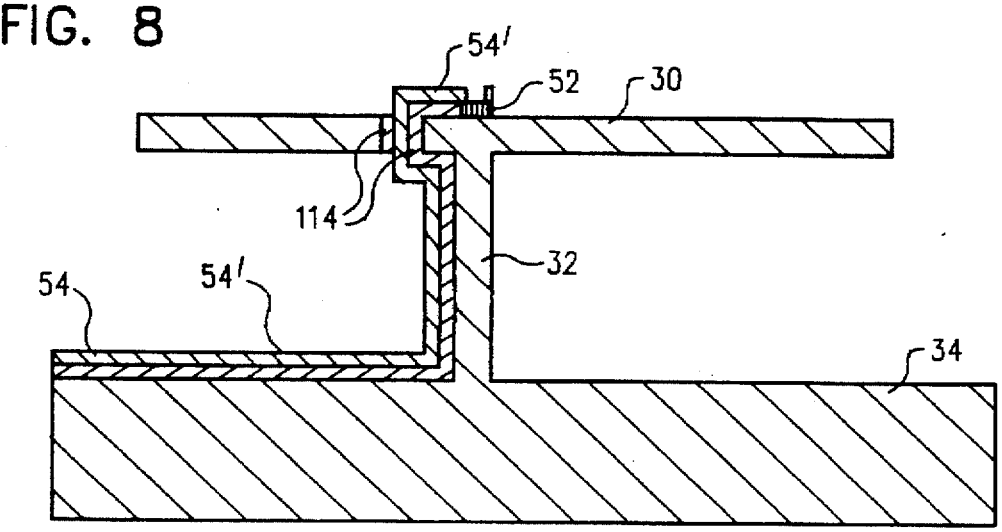
FIG. 8 is a detailed view of the electrical communication between a photoelectric device and a conductive line on a preferred embodiment of the invention.

FIG. 8 is a detailed view of the electrical communication between a photoelectric device and a conductive line on a preferred embodiment of the invention. It illustrates the electrical communication between the photoelectric device 52 and the conductive line 54. An insulative material 114 (e.g., made of deposited silicon oxide film) electrically isolates the conductive line 54 from the scanning cross-shaped plate 30 and flexible shaft 32.

FIG. 9 is a detailed view of a scanning laser configuration in accordance with the present invention. The bottom of a stacked diode laser 116 is in electrical communication with the scanning cross-shaped plate 30 and the flexible shaft 32. A conductive ring 118 electrically communicates with the top layer of the stacked diode laser 116 and the conductive line 54'. The insulative material 114 serves as both a mechanical support for the conductive ring 118 and an electrical isolator for the conductive ring 118 and the conductive line 54'. The stacked diode laser 116 produces a light beam 120.

FIG. 10 is a detailed view of an optically collimated photoreceptor configuration in accordance with the present invention. A lens 122, made of transparent material (e.g., made of deposited silicon oxide), focuses incoming light rays 124 onto a photosensitive semiconductor junction 126 (e.g., made of p-doped silicon). The conductive line 54' and the insulative material 114 serve the same function as in FIG. 8.

FIG. 11 is a detailed view of a tube-collimated photoreceptor configuration in accordance with the present invention. A tube 128, made of an electrically conductive material (e.g., made of deposited aluminum), passes an incoming incident light ray 130 onto a photosensitive semiconductor junction 126. The tube 128 simultaneously prevents any off-axis light ray 132 from reaching the photosensitive semiconductor junction 126. The tube 128 is electrically isolated from the scanning cross-shaped plate 30 and the flexible shaft 32, but is in electrical communication with the photosensitive semiconductor junction 126 and the conductive line 54'. The conductive line 54' and the insulative material 114 serve the same functions as they serve in FIG. 8.

Figure 12:
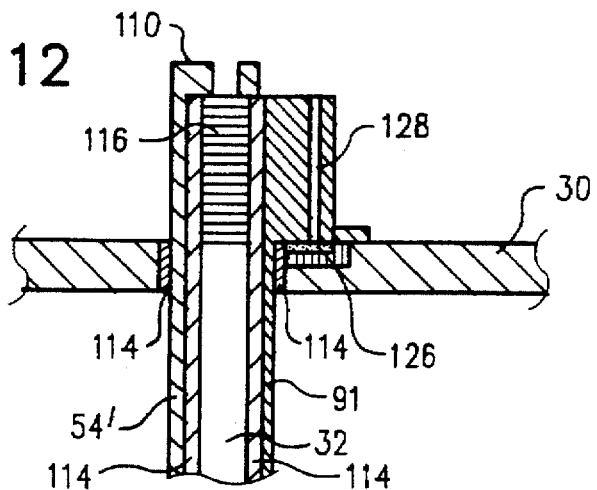
FIG. 12 is a detailed view of a combination laser and collimated photoreceptor configuration in accordance with the present invention.

FIG. 12 is a detailed view of a combination laser and collimated photoreceptor configuration in accordance with the present invention. The stacked diode laser 116 functions as it does in FIG. 9, and the tube-collimated photoreceptor functions as in FIG. 11. An additional conductive line 134 is required for electrical communication of the photosensitive semiconductor junction 126 with an external electrode.

Figure 13:
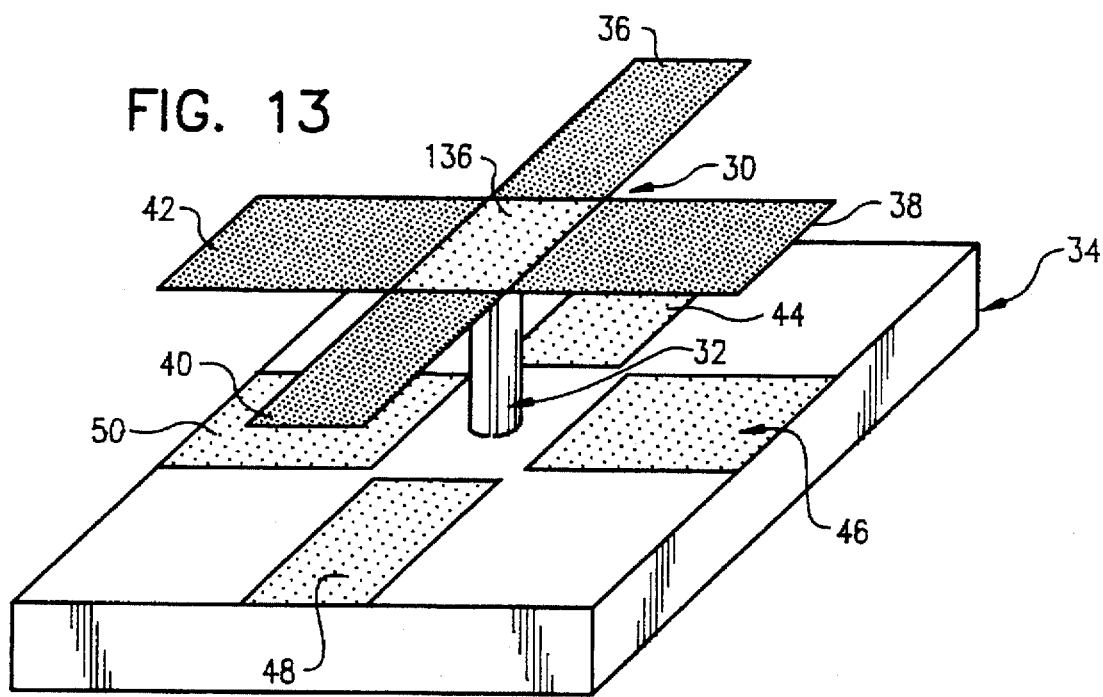
FIG. 13 is a detailed view of a moving reflector configuration in accordance with the present invention.

FIG. 13 is a detailed view of a moving reflector configuration in accordance with the present invention. The device is actuated in the same manner as described in FIG. 1 except that a reflector 136 (e.g., made of deposited aluminum film) is substituted for the photoelectric device 52.

Figure 14:
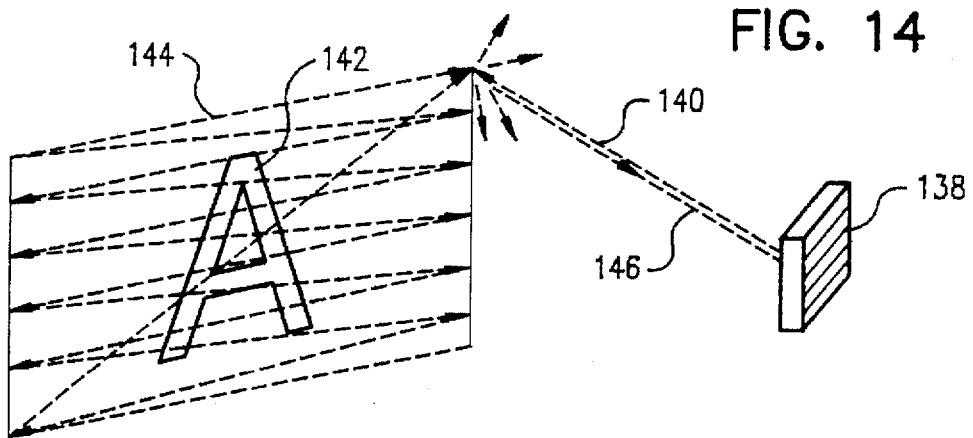
FIG. 14 illustrates the action of an embodiment of the present invention in use as a flying spot scanner.

FIG. 14 illustrates the action of an embodiment of the present invention in use as a flying spot scanner. The scanner 138 is in the configuration detailed in FIG. 9 with the photoreceptor 61 located on the fixed base 34. A light beam 140 emitted from the stacked diode laser 116 is scanned across an object 142 in the motion indicated by the reference numeral 144. Any light in the light beam 146 that is reflected from the object 142 is detected by the photoreceptor 56 located on the fixed base 34.

Figure 15:
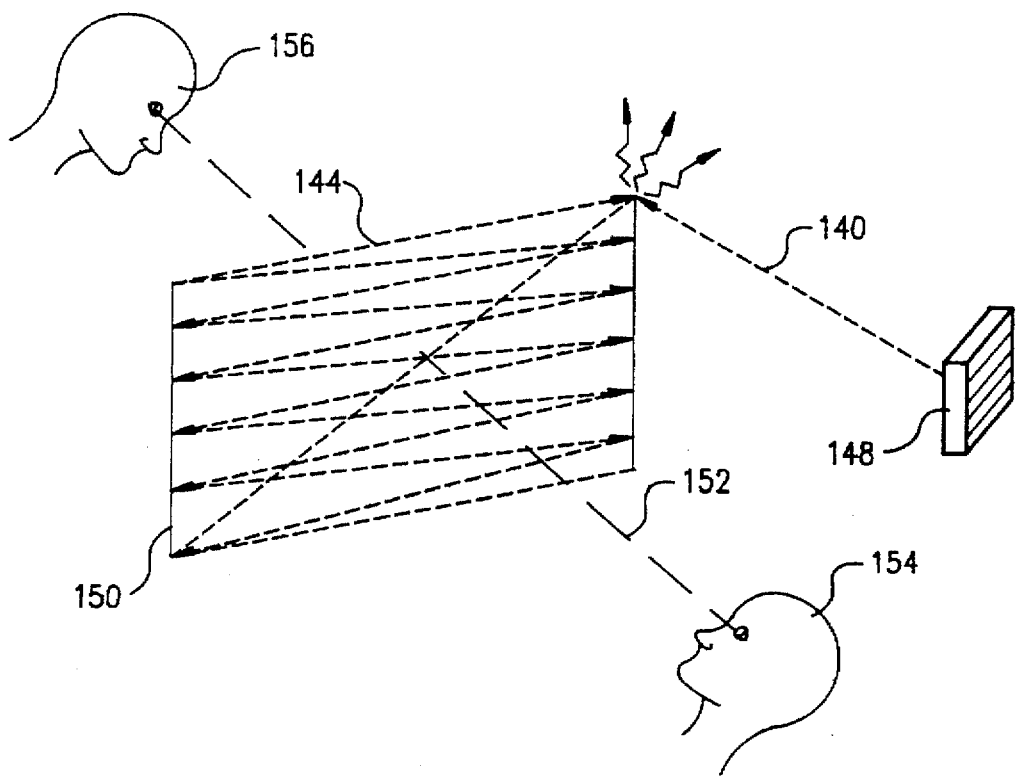
FIG. 15 illustrates the action of an embodiment of the present invention in use as a television monitor.

FIG. 15 illustrates the action of an embodiment of the present invention in use as a television monitor. The scanner 148 is in the configuration detailed in FIG. 9. A light beam 140 emitted from the stacked diode laser 116 is scanned across an opaque screen 150 in the motion indicated by the reference numeral 144. Any light in the light beam 152 that is reflected from the opaque screen 150 can be observed by an observer 154 located in front of the opaque screen 150. If the opaque screen 150 is translucent, the image produced on the opaque screen 150 can be observed by an observer 156 located behind the opaque screen 150.

Figure 16:
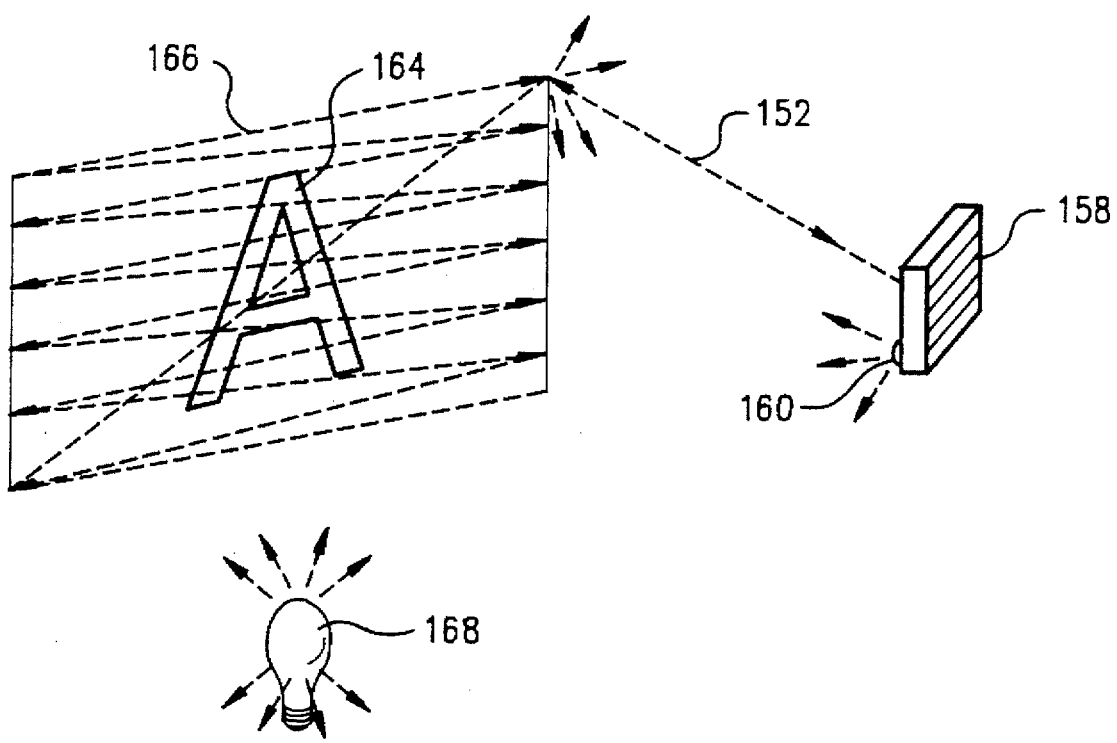
FIG. 16 illustrates the action of an embodiment of the present invention in use as an image dissector.

FIG. 16 illustrates the action of an embodiment of the present invention in use as an image dissector. A scanner 158 is in the configuration detailed in FIG. 10 or FIG. 11 with a photoemitter 66 located on the fixed base 34. A beam 152 of ambient light reflected off an object in an image field 164 is detected by a collimated photoreceptor 127. The collimated photoreceptor 127 is scanned across the image field 164 in the motion indicated by the reference numeral 166. The beam 162 of ambient light is supplied by either an external source 168 or a self contained photoemitter 160 located on the fixed base 34 of the scanner 158.

Figure 17:
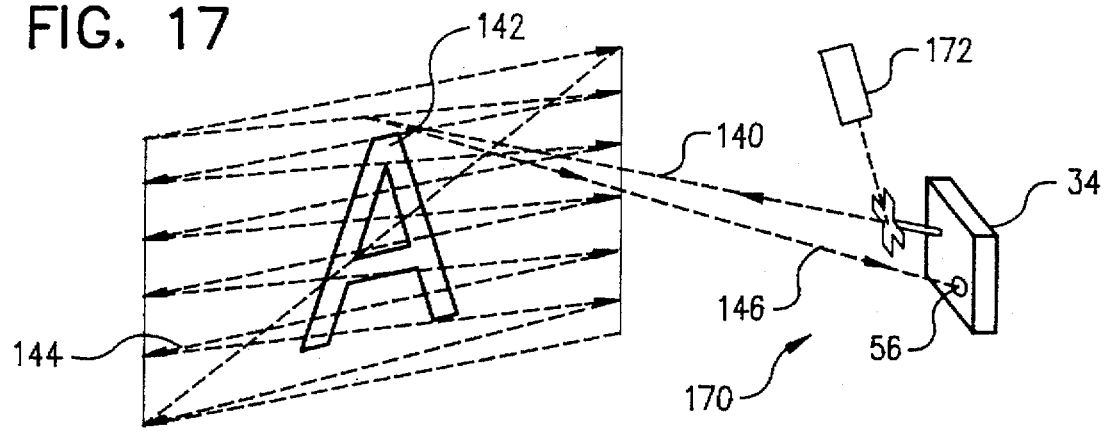
FIG. 17 illustrates the action of an embodiment of the present invention in use as a reflective flying spot scanner.

FIG. 17 illustrates the action of an embodiment of the present invention in use as a reflective flying spot scanner. A scanner 170 is in the configuration detailed in FIG. 13, with a photoreceptor 56 located on the fixed base 34. A light beam 140 that is emitted from the laser 172 and reflected off the scanner 170 is scanned across an object 142 in the motion indicated by the reference numeral 144. A light beam 146 that is reflected off the object 142 is detected by the photoreceptor 56 located on the fixed base 34.

Figure 18:
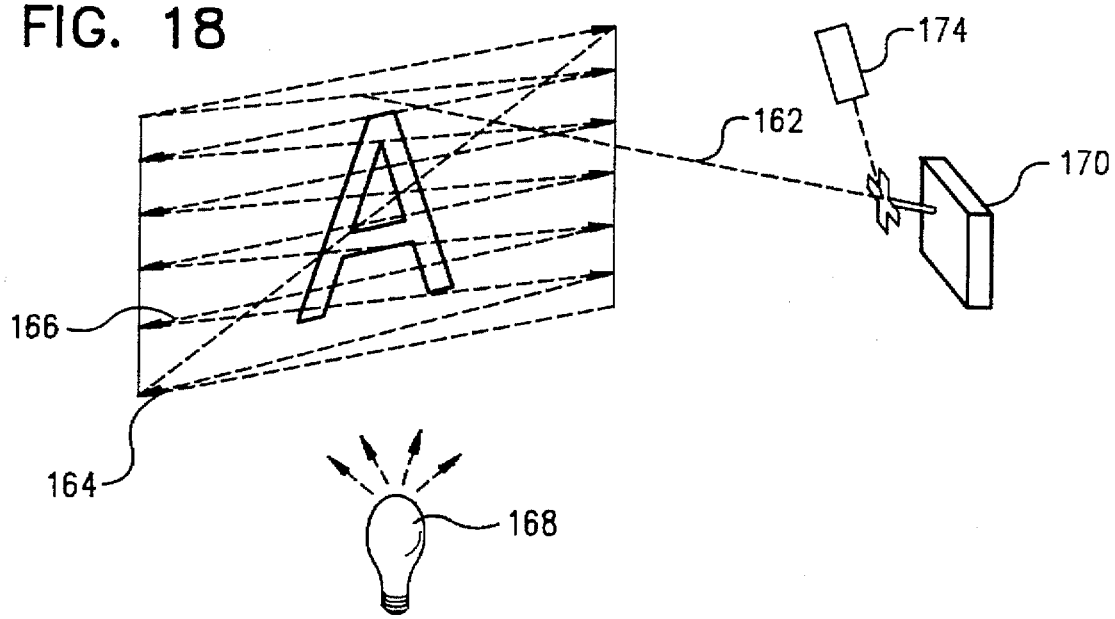
FIG. 18 illustrates action of an embodiment of the present invention in use as a reflective image dissector.

FIG. 18 illustrates action of an embodiment of the present invention in use as a reflective image dissector. The scanner 170 is in the configuration detailed in FIG. 13. A beam 162 of ambient light reflected off an object in the image field 164 is detected by a collimated photoreceptor 174. The collimated photoreceptor 174 is scanned across the image field 164 in the motion indicated by the reference numeral 166. The beam 162 of ambient light is supplied by an external source 168.

Additionally, if the scanner is operated in any of the configurations illustrated in FIGS. 9 through 18 with multispectral photoemitters/photodetectors and/or a plurality of such devices (e.g., a sensor for each primary color or other wavelengths) the scanner will produce natural or false color views of the scanned area or will produce a natural color or false color image in the case of the television monitor configuration.

Figure 19A:
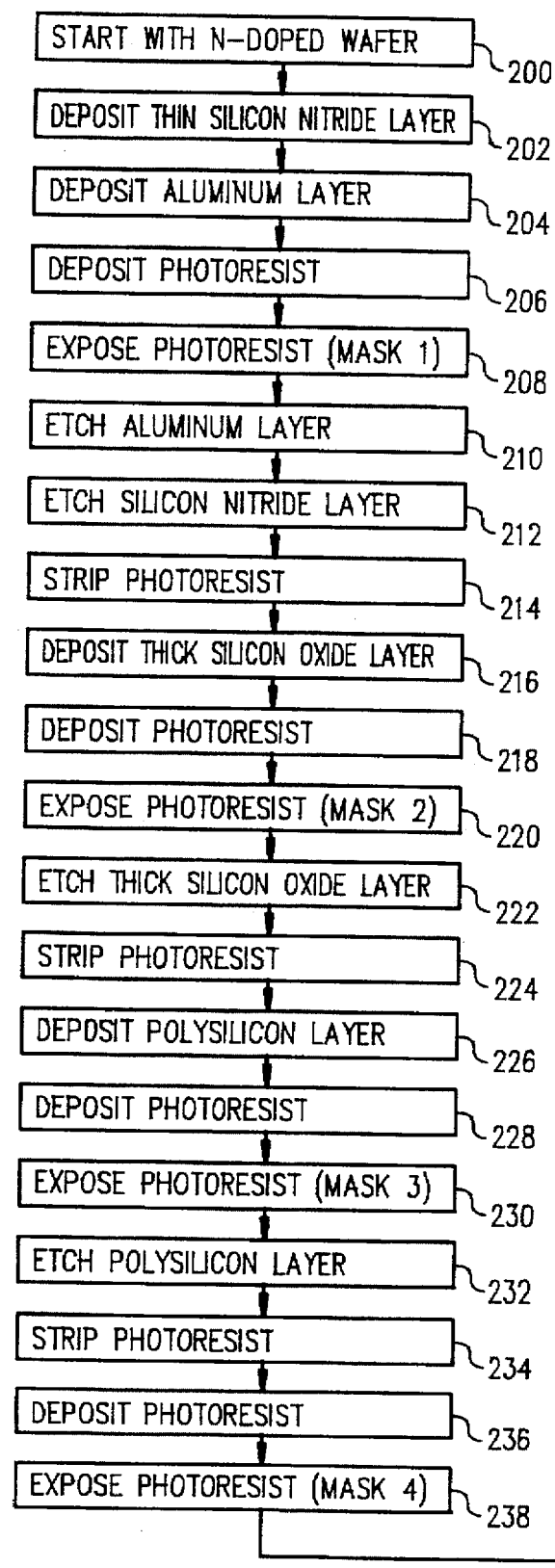
FIGS. 19a and 19b are a flow chart of an exemplary process for producing the illustrated embodiments of the present invention.
Figure 19B:
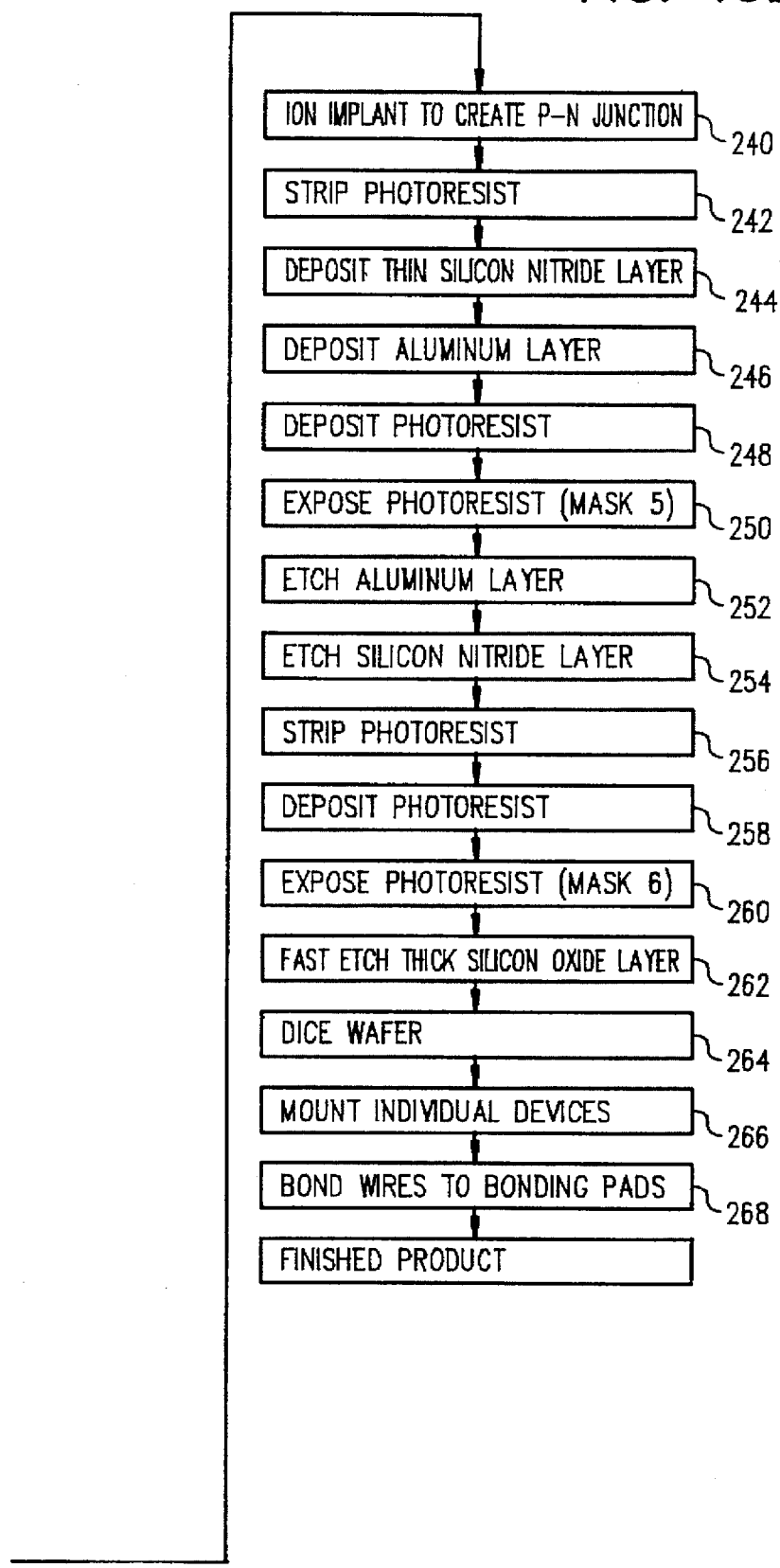

FIGS. 19a and 19b are a flow chart of an exemplary process for producing the illustrated embodiments of the present invention. The steps in the exemplary process are generally conventional steps in a conventional process familiar to those skilled in the art of producing microelectronic circuitry. The process begins with a wafer of n-doped silicon material sliced from an appropriately produced boule (step 200). This wafer serves as the base for the microelectromechanical television scanner of the invention. Next, a thin layer of nitride is deposited over the surface of the wafer of n-doped silicon material (step 202). This produces an insulator between the base and the actuator of the scanner of the present invention. Next a layer of aluminum is deposited over the insulation layer placed in step 202 (step 204). This serves as the material from which the actuator will be formed. Over the surface of the aluminum layer is deposited a layer of photoresist (step 206) which is exposed through the first mask (step 208).

Figure 20:
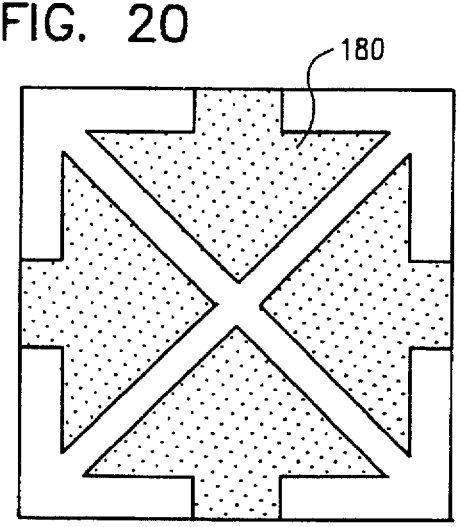
FIG. 20 is a first mask for use with the flow chart of FIGS. 19a and 19b.

FIG. 20 is a first mask for use with the flow chart of FIGS. 19a and 19b. The first mask causes the photoresist deposited in step 206 of FIG. 19a to make the aluminum layer susceptible to etchants which cause the removal of the aluminum layer and the nitride layer in all areas except those which are not exposed through the mask shown in FIG. 20. Therefore, the first mask generates four generally arrowhead-shaped areas to be masked while the rest of the nitride and aluminum layers on the upper surface of the base to be made susceptible to etchants.

Returning to the flow chart of FIGS. 19a and 19b, the portions of the aluminum and nitride layers which have not been protected by the first mask to be respectively etched away, in accordance with conventional processing techniques (steps 210 and 212). Following this, the photoresist deposited in step 206 is striped from the upper surfaces of the remaining portions of the uppermost aluminum layer (step 214).

Figure 21:
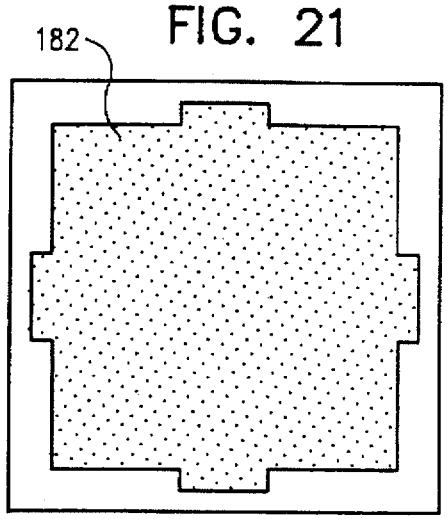
FIG. 21 is a second mask for use with the flow chart of FIGS. 19a and 19b.

Next a thick layer of oxide is formed over the base, nitride and aluminum layers of the wafer (step 216). The purpose of the layer of oxide deposited in step 216 is to electrically insulate the aluminum layer from the remainder of the transducer, and its thickness is great enough to produce the desired degree of electrical insulation. Next, a second layer of photoresist is formed over the thick layer of oxide, in accordance with the pattern of a second mask (step 218). FIG. 21 is a second mask for use with the flow chart of FIGS. 19a and 19b. It defines the areas over the aluminum electrodes formed previously which are to be electrically insulated.

Returning to the flow chart of FIG. 19a, the photoresist layer deposited in step 218 is exposed through the second mask to define the shape of the insulation placed over the aluminum electrodes (step 220). Next, the thick oxide layer is etched from those areas exposed through the second mask (step 222), leaving the desired insulation patch. After the insulation patch has been formed, the photoresist deposited in step 218 is striped away (step 224).

Figure 22:
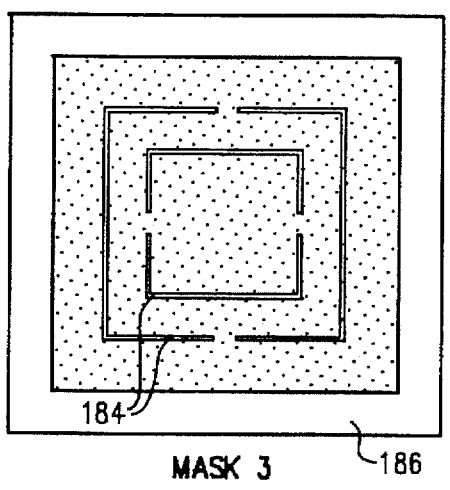
FIG. 22 is a third mask for use with the flow chart of FIGS. 19a and 19b.

The next stages in the process described in the flow chart of FIGS. 19a and 19b define the gimbal of the scanner of the present invention. A layer of conventional polysilicon is deposited over the insulated aluminum electrodes (step 226) and a layer of photoresist formed over the upper surface of the layer of polysilicon (step 228). The layer of silicon is exposed through a third mask (step 230). FIG. 22 is a third mask for use with the flow chart of FIGS. 19a and 19b. The third mask defines the perforations which create the gimbal mechanism, which allows the scanner to move mechanically in response to electrical signals which will be supplied to it. The gimbal shown in FIG. 22 has two pairs of pivot points arranged orthogonally to one another. If desired any other appropriate type of gimbal device, such as the spiral gimbal shown in FIG. 3 may be formed at this stage.

As shown in FIG. 19a, the polysilicon layer deposited in step 226 is etched in accordance with the pattern produced by exposing the photoresist through the third mask (step 232) and then the photoresist deposited in step 228 is stripped away (step 234).

Figure 23:
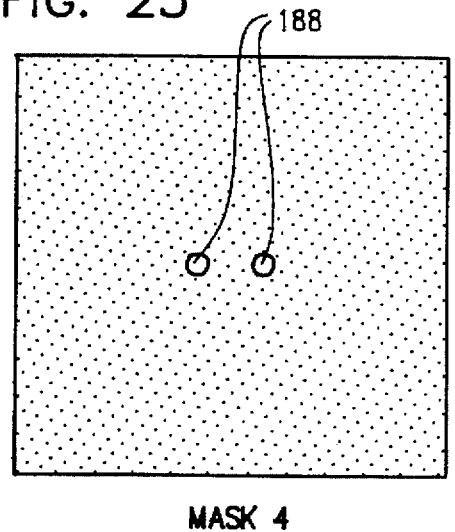
FIG. 23 is a fourth mask for use with the flow chart of FIGS. 19a and 19b.

In the next stage of processing, the photodiodes on the upper surface of the scanner are produced. The process begins with the deposit of a layer of photoresist over the entire upper surface of the device at this stage of its production (step 236). The deposited photoresist is then exposed through the fourth mask (step 238). FIG. 23 is the fourth mask for use with the flow chart of FIGS. 19a and 19b. The fourth mask defines two small circles at the center of the scanner. p-type ions are implanted through the two small circles to produce the pn junction of the photodiode (step 240) and the photoresist deposited in step 236 is stripped away (step 242).

The next stage of processing is to produce the insulated connections between the photodiode formed in steps 236–242 and the external world. First, a thin nitride layer is formed over the upper surface of the scanner as it exists at this stage of the process (step 244). This will serve as an insulator between the interconnections and the remainder of the scanner. Next an aluminum layer is deposited over the thin nitride layer formed in step 244 (step 246). After this, a layer of photoresist is deposited (step 248) and the photoresist exposed through a fifth mask (step 250).

Figure 24:
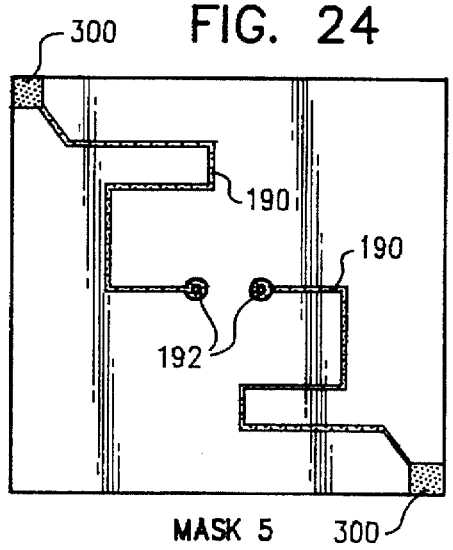
FIG. 24 is a fifth mask for use with the flow chart of FIGS. 19a and 19b.

FIG. 24 is a fifth mask for use with the flow chart of FIGS. 19a and 19b. The fifth mask produces the electrical traces between the photodiodes formed previously and pads 300. The aluminum layer formed in step 246 is stripped away according to the pattern of the fifth mask (step 252), the nitride layer deposited in step 244 is stripped away (step 254) and the photoresist deposited in step 248 is then stripped away (step 256).

Figure 25:
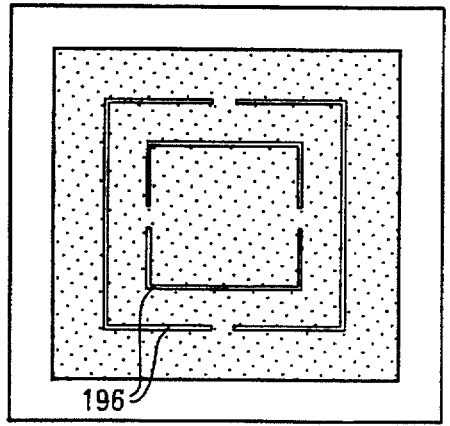
FIG. 25 is a sixth mask for use with the flow chart of FIGS. 19a and 19b.

In the next stage of the process shown in the flow charts of FIGS. 19a and 19b, the cross-shaped plate is formed by undercutting the oxide formed in step 216 to separate the resulting thin layer from the base layer formed by the original wafer of silicon material. This is accomplished by depositing a layer of a photoresist (step 258) and exposing the photoresist through a sixth mask (step 260). FIG. 25 is an example of the sixth mask for use with the flow chart of FIGS. 19a and 19.

In accordance with the pattern of photoresist deposited in step 258 and exposed in step 260, the thick oxide layer is etched away using a fast etchant (step 262). This causes the oxide under the photodiodes to be etched away, leaving only a thin layer of polysilicon having the photodiodes formed thereon.

Now that the exemplary embodiment of the scanner of the present invention has been formed on the upper surface of the base material of n-doped wafer, it is separated from the remainder of the wafer by dicing the wafer (step 264). It is understood by those skilled in the art that many copies of scanners can be produced simultaneously by using conventional microcircuit processing techniques. Thereafter, the individual devices are mounted on bases (step 266) and appropriate electrical connections are made to the pads formed in steps 244–256 (step 268). The result is the desired scanner.

It will thus be seen that the objects set forth above, and those made apparent in the foregoing description, are effectively attained and since certain changes may be made in the above construction without departing from the scope of the invention, all matters contained in the foregoing description or shown in the accompanying drawings should be interpreted as illustrative and not in a limiting sense.

It is also understood that the following claims are intended to cover all of the generic and specific features of the invention herein described, and all statements of the scope of the invention which, as a matter of language, might be said to fall therebetween.

I claim:

1. A scanning device, comprising:

a substrate made from a first material;

a flexible joint located above the substrate, the flexible joint being made from a second material;

a support attached to the flexible joint, the support being made from a third material;

an actuator formed on at least one of the substrate, the flexible joint and the support, the actuator being able to cause the support to move relative to the substrate; and an optical element on the upper surface of the support.

2. The scanning device of claim 1 wherein the optical element is a photosensitive device, the scanning device further comprising at least one electrical conductor passing from the substrate to the photosensitive device.

3. The scanning device of claim 2, further comprising a light collimator that collimates light before the light reaches the photosensitive device.

4. The scanning device of claim 3 wherein the collimator is a cylindrical aperture formed in the support, the axial dimension of the cylindrical aperture being many times longer than the largest dimension of the cylindrical aperture in any direction perpendicular to the axial dimension of the cylindrical aperture.

5. The scanning device of claim 1 wherein the optical element is a light-emitting device, the scanning device further comprising at least one electrical conductor passing from the substrate to the light-emitting device.

6. The scanning device of claim 5 wherein the light-emitting device is a laser.

7. The scanning device of claim 6 wherein the laser is a semiconductor laser formed in the support.

8. The scanning device of claim 1 wherein the optical element is a light-reflective device.

9. The scanning device of claim 1 wherein the actuator includes a transducer for converting an electrical signal into thermal energy.

10. The scanning device of claim 1 wherein the actuator includes a piezoelectric transducer for converting an electrical signal into mechanical energy.

11. The scanning device of claim 1 wherein the actuator includes a transducer for converting an electrical signal into electromagnetic energy.

12. The scanning device of claim 11, wherein the support includes a cross-shaped member having four arms formed in two pairs, the transducer being able to act on each of the pairs of opposing arms independently.

13. The scanning device of claim 1 wherein the flexible joint allows the actuator to cause at least one of the substrate, the flexible joint and the support to move in at least one dimension.

14. The scanning device of claim 13 wherein the flexible joint includes a gimbal joint formed between the substrate and the support, the gimbal joint allowing the support to move in two dimensions relative to the substrate.

15. The scanning device of claim 13 wherein the flexible joint includes a spiral spring suspension formed between the substrate and the support, the spiral spring suspension allowing the support to move in two dimensions relative to the substrate.

16. The scanning device of claim 13 wherein the flexible joint includes a structure that is attached to and rises above the substrate.

17. The scanning device of claim 1 wherein the optical element is responsive to at least two separate wavelengths of light, and produces signals representative of its responses to the at least two wavelengths of light.

18. A method for forming a scanning device, comprising the steps of:

a) forming a substrate from a first material;

b) forming a flexible joint over the substrate, the flexible joint being made from a second material;

c) attaching a support to the flexible joint, the support being made from a third material;

d) forming an actuator on at least one of the substrate, the flexible joint and the support, the actuator being able to cause the support to move relative to the substrate; and e) forming an optical element on the upper surface of the support.

* * * * *